United States Patent
Gajjar et al.

(10) Patent No.: US 10,496,480 B2
(45) Date of Patent: *Dec. 3, 2019

(54) SLICE LOCATION IDENTIFICATION

(71) Applicant: International Business Machines Corporation, Armonk, NY (US)

(72) Inventors: Vimalkumar P. Gajjar, Roselle, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/002,638

(22) Filed: Jun. 7, 2018

(65) Prior Publication Data

US 2018/0285194 A1 Oct. 4, 2018

Related U.S. Application Data

(63) Continuation of application No. 15/688,030, filed on Aug. 28, 2017, now Pat. No. 10,073,737, which is a
(Continued)

(51) Int. Cl.
*G06F 11/10* (2006.01)
*H04L 12/911* (2013.01)
(Continued)

(52) U.S. Cl.
CPC ............ *G06F 11/108* (2013.01); *G06F 3/064* (2013.01); *G06F 3/067* (2013.01); *G06F 3/0619* (2013.01);
(Continued)

(58) Field of Classification Search
CPC ............... G06F 11/1076; G06F 11/108; G06F 21/6218; G06F 21/64; G06F 3/0619;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Todd L Barker
(74) *Attorney, Agent, or Firm* — Garlick & Markison; Timothy W. Markison; Bruce E. Stuckman

(57) ABSTRACT

A method for execution by a dispersed storage and task (DST) client module includes obtaining a data identifier for slice location identification. A source name corresponding to the data identifier is identified. A plurality of data segments are identified based on the source name. A set of slice names are generated for each of the plurality of data segments. A set of DST execution units are identified based on the sets of slice names. A set of query requests are generated for each data segment for transmission to the set of DST execution units. Query responses are received from the set of DST execution units. A storage record is generated that includes storage location information of the query responses. Migration of at least some encoded data slices associated with the sets of slice names is facilitated when the storage record compares unfavorably to a storage record requirement.

14 Claims, 6 Drawing Sheets

Related U.S. Application Data continuation-in-part of application No. 15/442,273, filed on Feb. 24, 2017, now Pat. No. 9,772,904, which is a continuation of application No. 13/959,262, filed on Aug. 5, 2013, now Pat. No. 9,667,701, which is a continuation-in-part of application No. 12/816,126, filed on Jun. 15, 2010, now Pat. No. 9,692,593, said application No. 15/442,273 is a continuation-in-part of application No. 15/230,145, filed on Aug. 5, 2016, now Pat. No. 9,819,484, which is a continuation of application No. 14/292,727, filed on May 30, 2014, now Pat. No. 9,413,529, which is a continuation-in-part of application No. 13/736,848, filed on Jan. 8, 2013, now Pat. No. 9,009,491, which is a continuation of application No. 12/814,467, filed on Jun. 13, 2010, now Pat. No. 8,351,600.

(60) Provisional application No. 61/711,106, filed on Oct. 8, 2012, provisional application No. 61/256,411, filed on Oct. 30, 2009.

(51) Int. Cl.
*H04L 29/08* (2006.01)
*G06F 9/50* (2006.01)
*G06F 21/64* (2013.01)
*H04L 12/26* (2006.01)
*G06F 3/06* (2006.01)
*G06F 21/62* (2013.01)
*H04L 29/06* (2006.01)

(52) U.S. Cl.
CPC ........ *G06F 9/5027* (2013.01); *G06F 11/1076* (2013.01); *G06F 21/6218* (2013.01); *G06F 21/64* (2013.01); *H04L 43/0852* (2013.01); *H04L 47/70* (2013.01); *H04L 67/10* (2013.01); *H04L 67/1097* (2013.01); *H04L 67/306* (2013.01); *H04L 67/32* (2013.01); *H04L 63/08* (2013.01); *H04L 63/102* (2013.01)

(58) Field of Classification Search
CPC ........ G06F 3/064; G06F 3/067; G06F 9/5027; H04L 43/0852; H04L 47/70; H04L 67/10; H04L 67/1097; H04L 67/306; H04L 67/32; H04L 63/08; H04L 63/102
See application file for complete search history.

(56) References Cited

U.S. PATENT DOCUMENTS

| | | |
|---|---|---|
| 5,485,474 A | 1/1996 | Rabin |
| 5,699,365 A | 12/1997 | Klayman et al. |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,960,344 A | 9/1999 | Mahany |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,324 B1 | 7/2002 | Doviak et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 6,934,266 B2 | 8/2005 | Dulin et al. |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,325,141 B2 | 1/2008 | Chow et al. |
| 7,636,724 B2 | 12/2009 | de la Torre et al. |
| 8,031,875 B1 | 10/2011 | Juels et al. |
| 8,468,368 B2 | 6/2013 | Gladwin et al. |
| 8,885,821 B2 | 11/2014 | Grube et al. |
| 9,064,127 B2 * | 6/2015 | O'Hare .............. H04L 9/085 |
| 9,245,148 B2 * | 1/2016 | Runkis .............. G06F 21/6218 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0174840 A1 | 9/2003 | Bogan |
| 2003/0191856 A1 | 10/2003 | Lewis et al. |
| 2004/0024963 A1 | 2/2004 | Talagala et al. |
| 2004/0049572 A1 | 3/2004 | Yamamoto et al. |
| 2004/0049700 A1 | 3/2004 | Yoshida |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0157674 A1 | 7/2005 | Wentink |
| 2005/0229069 A1 | 10/2005 | Hassner et al. |
| 2006/0034453 A1 | 2/2006 | Liu |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0263113 A1 | 10/2008 | Krishnaiyer et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0115063 A1 | 5/2010 | Gladwin et al. |
| 2011/0106909 A1 | 5/2011 | Gladwin |
| 2011/0182424 A1 | 7/2011 | Grube et al. |
| 2011/0185193 A1 | 7/2011 | Grube et al. |
| 2012/0137095 A1 | 5/2012 | Grube et al. |
| 2013/0138970 A1 | 5/2013 | Resch et al. |

(56) References Cited

U.S. PATENT DOCUMENTS

2014/0108796 A1* 4/2014 Johnson .............. G06F 21/6272
713/167

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Yu et al., "A highly efficient, low delay architecture for transporting H.264 video over wireless channel", Image Communication 19 (2004), pp. 369-385, Elsevier Publishing. [Document available for review in USPTO records in U.S. Appl. No. 13/959,262. A NPL was not provided to Applicant.].
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

* cited by examiner distributed, or dispersed, storage network (DSN) 10

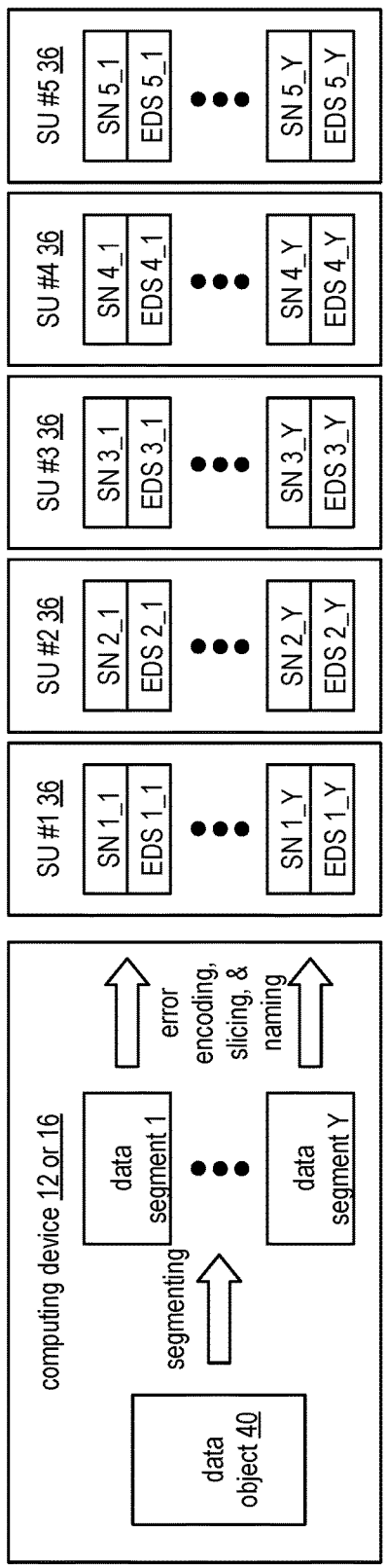
FIG. 3
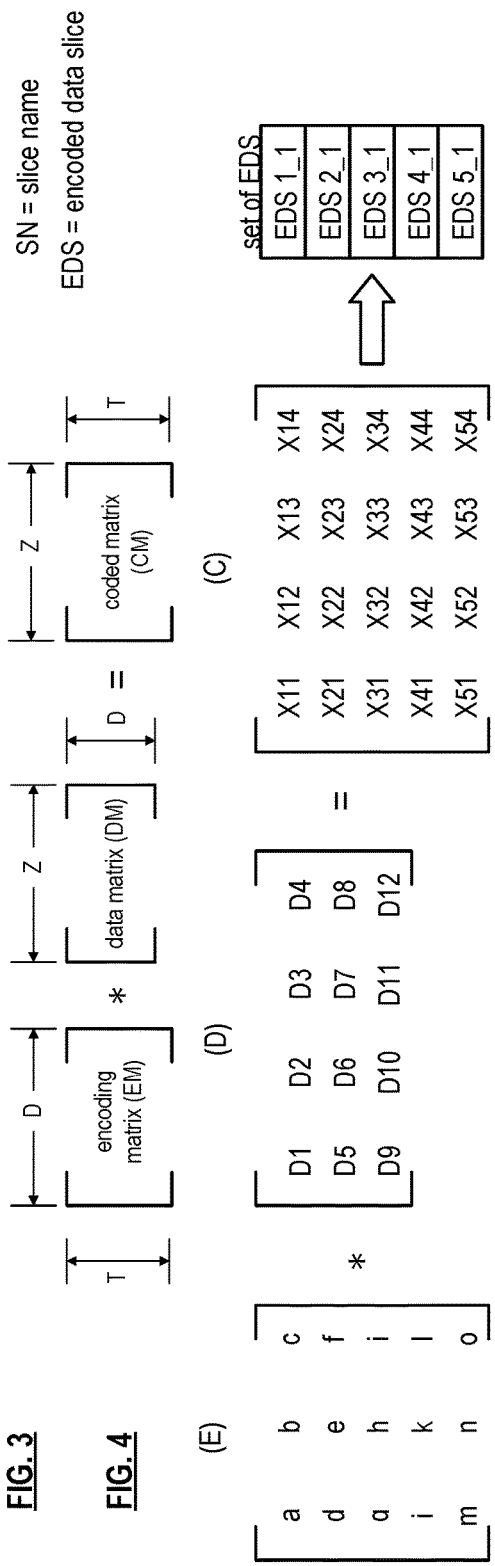
FIG. 4
FIG. 5
FIG. 6

SLICE LOCATION IDENTIFICATION

CROSS-REFERENCE TO RELATED APPLICATIONS

The present U.S. Utility patent application claims priority pursuant to 35 U.S.C. § 120 as a continuation of U.S. Utility application Ser. No. 15/688,030, entitled "SLICE LOCATION IDENTIFICATION", filed Aug. 28, 2017, which is a continuation-in-part of U.S. Utility application Ser. No. 15/442,273, entitled "ROBUST RECEPTION OF DATA UTILIZING ENCODED DATA SLICES", filed Feb. 24, 2017, issued as U.S. Pat. No. 9,772,904 on Sep. 26, 2017, which is a continuation of U.S. Utility application Ser. No. 13/959,262, entitled "ROBUST RECEPTION OF DATA UTILIZING ENCODED DATA SLICES", filed Aug. 5, 2013, issued as U.S. Pat. No. 9,667,701 on May 30, 2017, which claims priority pursuant to 35 U.S.C. § 119(e) to U.S. Provisional Application No. 61/711,106, entitled "PRIORITIZING TASKS IN A DISTRIBUTED STORAGE AND TASK NETWORK", filed Oct. 8, 2012, all of which are hereby incorporated herein by reference in their entirety and made part of the present U.S. Utility patent application for all purposes.

U.S. Utility application Ser. No. 13/959,262 also claims priority pursuant to 35 U.S.C. § 120 as a continuation-in-part of U.S. Utility application Ser. No. 12/816,126, entitled "ROBUST RECEPTION OF DATA UTILIZING ENCODED DATA SLICES", filed Jun. 15, 2010, issued as U.S. Pat. No. 9,692,593 on Jun. 27, 2017, which claims priority pursuant to 35 U.S.C. § 119(e) to U.S. Provisional Application No. 61/256,411, entitled "DISTRIBUTED STORAGE NETWORK DATA PROCESSING", filed Oct. 30, 2009.

U.S. Utility application Ser. No. 15/442,273 also claims priority pursuant to 35 U.S.C. § 120 as a continuation-in-part of U.S. Utility application Ser. No. 15/230,145, entitled "DISTRIBUTED STORAGE NETWORK AND METHOD FOR STORING AND RETRIEVING ENCRYPTION KEYS", filed Aug. 5, 2016, issued as U.S. Pat. No. 9,819,484 on Nov. 14, 2017, which is a continuation of U.S. Utility application Ser. No. 14/292,727, entitled "DISTRIBUTED STORAGE NETWORK AND METHOD FOR STORING AND RETRIEVING ENCRYPTION KEYS", filed May 30, 2014, issued as U.S. Pat. No. 9,413,529 on Aug. 9, 2016, which is a continuation-in-part of U.S. Utility application Ser. No. 13/736,848, entitled "DISTRIBUTED STORAGE NETWORK AND METHOD FOR ENCRYPTING AND DECRYPTING DATA USING HASH FUNCTIONS", filed Jan. 8, 2013, issued as U.S. Pat. No. 9,009,491 on Apr. 14, 2015, which is a continuation of U.S. Utility application Ser. No. 12/814,467, entitled "DISTRIBUTED STORAGE NETWORK AND METHOD FOR ENCRYPTING AND DECRYPTING DATA USING HASH FUNCTIONS", filed Jun. 13, 2010, issued as U.S. Pat. No. 8,351,600 on Jan. 8, 2013, which claims priority pursuant to 35 U.S.C. § 119(e) to U.S. Provisional Application No. 61/256,411, entitled "DISTRIBUTED STORAGE NETWORK DATA PROCESSING", filed Oct. 30, 2009, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
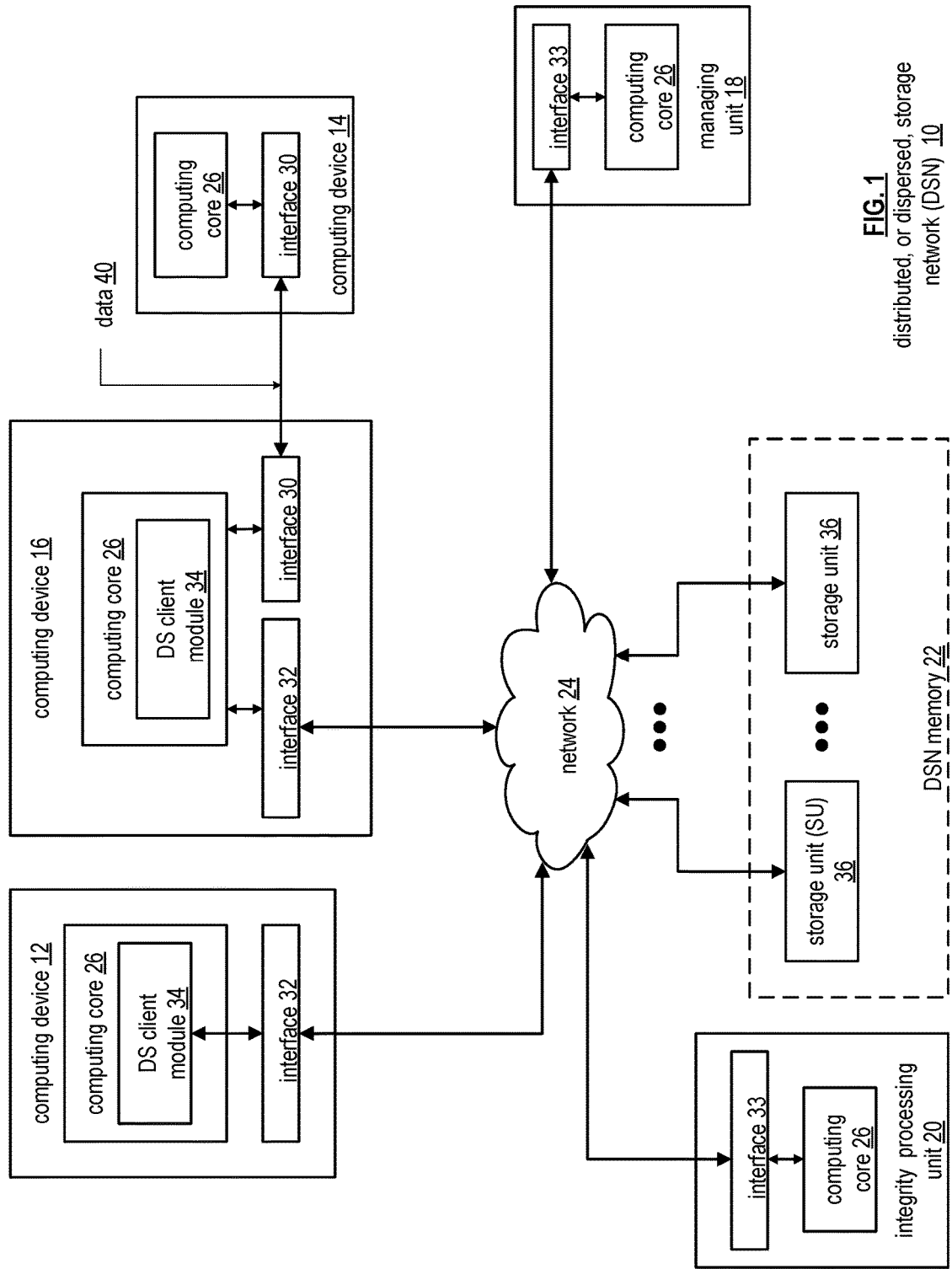
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
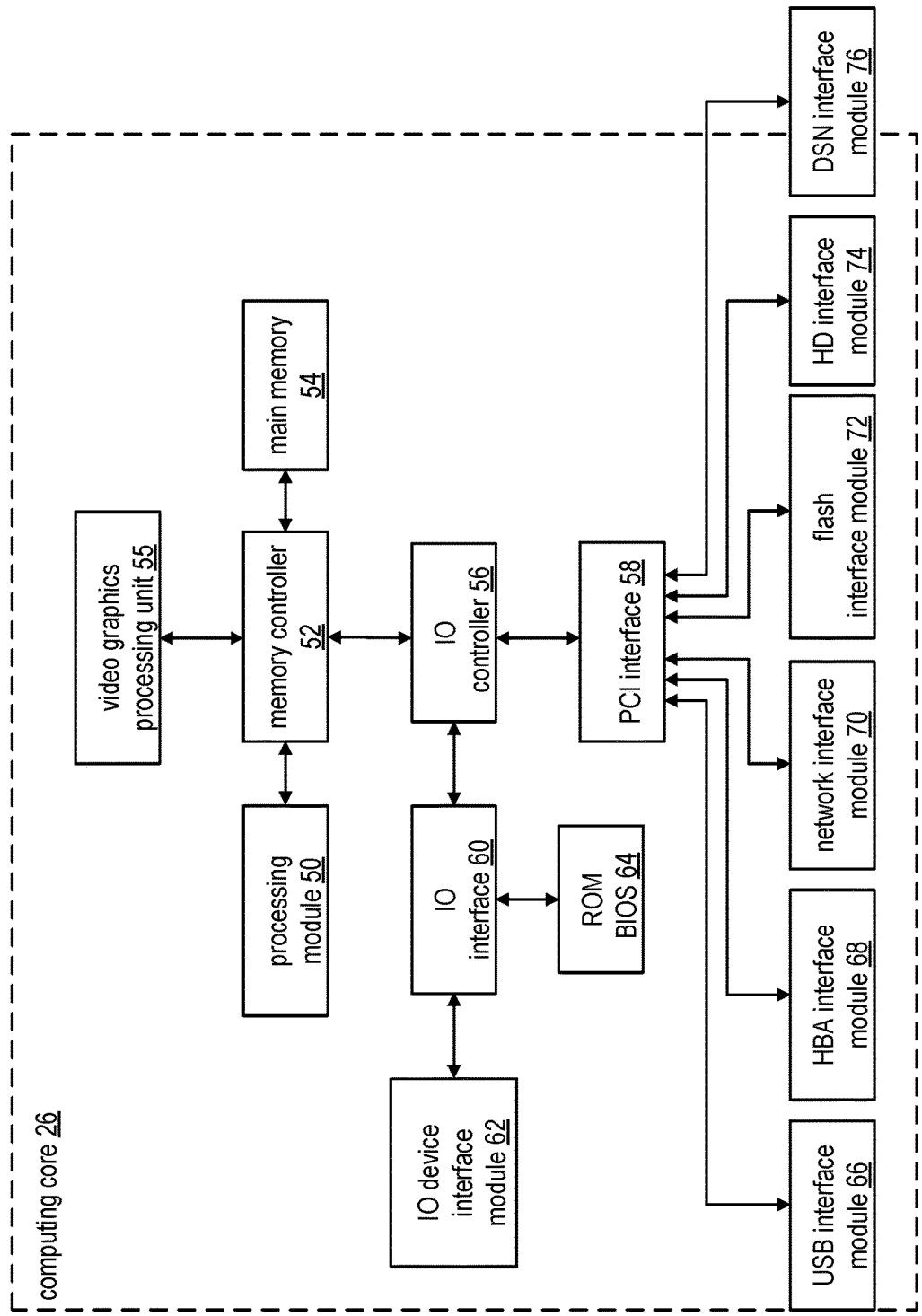
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the 10 device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
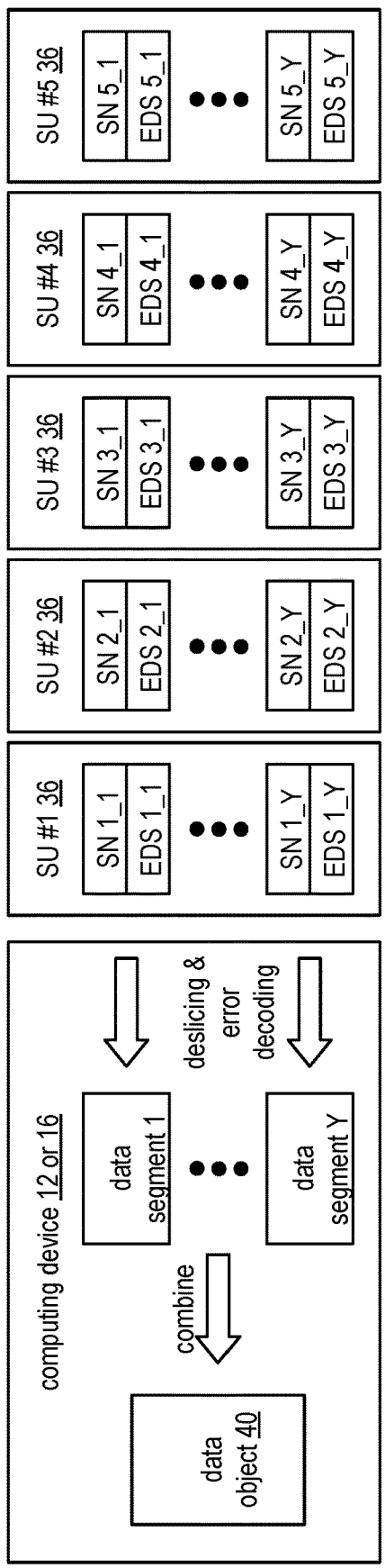
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
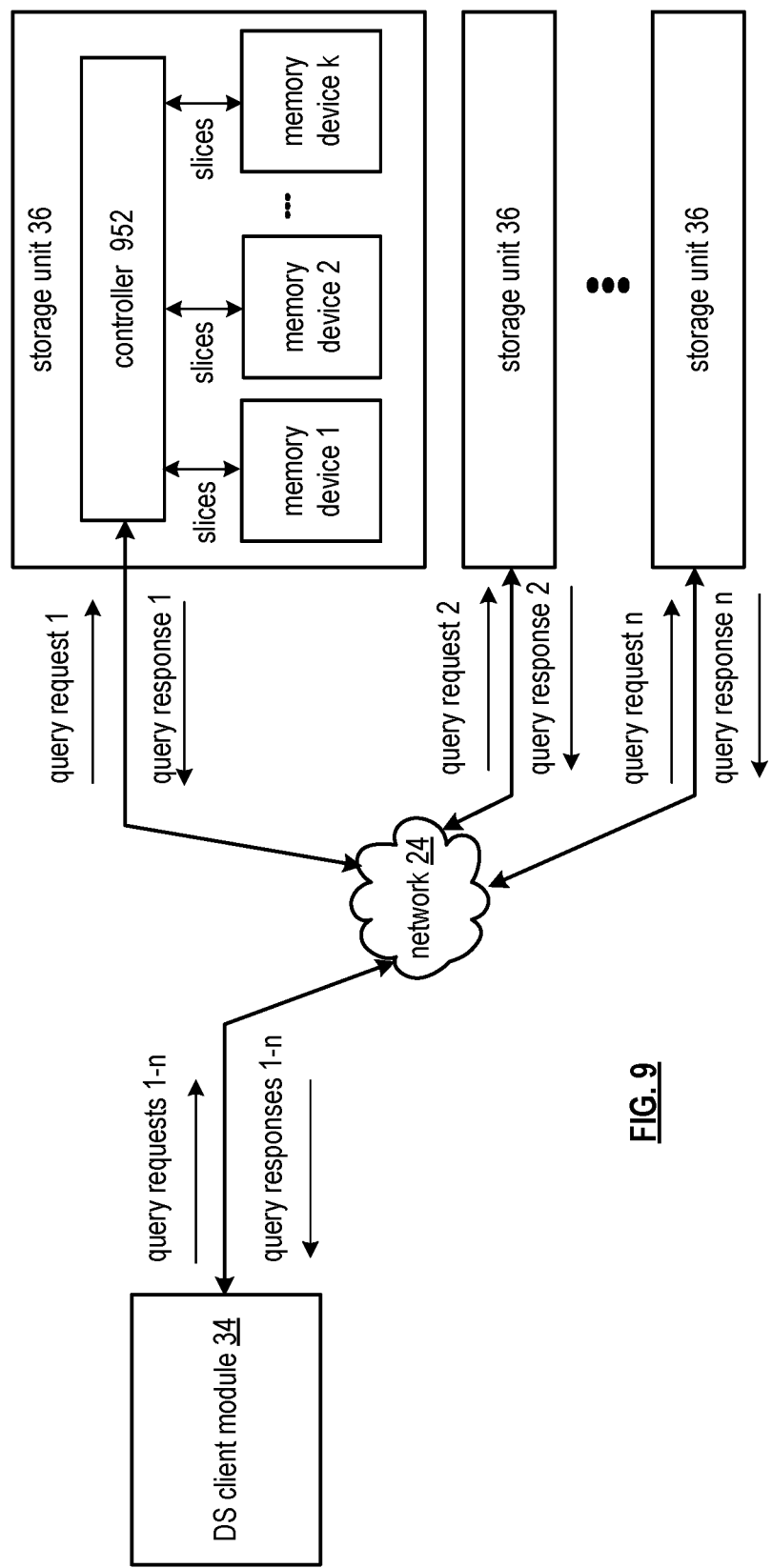
FIG. 9 is a schematic block diagram of an embodiment of a dispersed or distributed storage network (DSN) in accordance with the present invention.

FIG. 9 is a schematic block diagram of another embodiment of a distributed computing system that includes a DS client module 34 of FIG. 1, the network 24 of FIG. 1, and a plurality of storage units 36 of FIG. 1. Some or all storage units 36 can utilized as DST execution units, operable to store dispersed error encoded data and/or to execute, in a distributed manner, one or more tasks on data as discussed herein. As used herein, storage units 36 will be interchangeably referred to as DST execution units. Each storage unit 36 of the plurality of storage units 36 can include a controller 952 and a plurality of memory devices 1-k. The plurality of memory devices function to store encoded data slices, and each storage unit 36 can include the same or different number of memory devices. Some or all of the memory devices can be implemented by utilizing main memory 54 of computing core 26 of FIG. 2, or another memory device that operable to store encoded data slices. The controller can be implemented by utilizing computing core 26 of FIG. 2, for example, by utilizing memory controller 52, and/or can be implemented by utilizing a processing device or other computing component that includes a processor operable to be utilized as a controller for storing encoded data slices in memory devices. While the DS client module 34 depicted in FIG. 9 communicates directly with the DST execution units via network 24, the DS client module 34 can be a DS client module of a computing device 12 or 16 of FIG. 1, or of another computing component of the DSN that communicates with the DST execution units. For example, a DS client module 34 of a computing device 16 can communicate with the DST execution units via network 24 by utilizing interface 32 of the computing device 16, as illustrated in FIG. 1. The DS client module can include a processor and memory, and, as illustrated in FIG. 1, can utilize some or all of the elements of computing core 26 of FIG. 2, such as the processing module 50 of FIG. 2 and/or the main memory 54 of FIG. 2. The dispersed storage client module 34 can be utilized as a dispersed storage and task (DST) client module, operable to enable the corresponding computing device to disperse storage error encode and decode data and/or to facilitate execution of one or more tasks on data in a dispersed manner, for example, by utilizing the DST execution units. The system functions to verify utilization of storage capacity of the plurality of DST execution units with regards to storage of encoded data slices.

The DS client module 34 can identify a file for storage analysis. The identifying can be based on one or more of receiving a request, a predetermination, a list, utilizing a round robin approach, identifying the file as a next file on a file list. The DS client module 34 generates a plurality of sets of slice names corresponding to a plurality of sets of encoded data slices stored in the plurality of DST execution units. The file is segmented to produce a plurality of segments. Each segment of the plurality of segments is encoded utilizing a dispersed storage error coding function to produce a set of encoded data slices. The generating of the plurality of sets of slice names can be based on one or more of a file identifier (ID) of the file, a vault ID corresponding to the file ID, and a registry lookup.

The DS client module 34 can identify a set of DST execution units of the plurality of DST execution units associated with storage of the plurality of sets of encoded data slices. The identifying can be based on one or more of receiving identifiers of the set of DST execution units, a registry lookup, and a distributed storage and task network (DSTN) virtual address to physical location table lookup.

For each DST execution unit of the set of DST execution units, the DS client module 34 can generate a plurality of query requests corresponding to the plurality of sets of encoded data slices. Each query request of the plurality of query requests includes a slice name corresponding to an encoded data slice of a set of encoded data slices stored in a memory device of the plurality of memory devices of the DST execution unit. The DS client module 34 outputs the query request to the DST execution unit, for example, by transmitting the query request via the network 24.

A corresponding controller of the DST execution unit can receive the query request and identifies the memory device of the plurality of memory devices that is utilized to store the encoded data slice. The DST execution unit generates a query response. The query response can include one or more of the slice name, storage location information which includes an identifier of the memory device, a length of time of storage indicator, a memory device age, and/or a memory device replacement schedule. The generating includes at least one of accessing a local table and retrieving information from the memory device. The DST execution unit can output the query response to the DS client module 34, for example, by transmitting the query response via the network 24.

For the set of encoded data slices, the DS client module 34 can receive a set of query responses from the set of DST execution units. The DS client module 34 facilitates a storage action based on the set of query responses. A first storage action can include generating a storage record that includes one or more of the file ID, a source name corresponding to the file ID, identity of the plurality of data segments, the plurality of sets of slice names, identity of the set of DST execution units, and/or the storage location information within each DST execution unit of the set of DST execution units. A second storage action can include migrating at least some encoded data slices of the plurality of sets of encoded data slices when the storage record compares unfavorably to a storage record requirement, which can include a desired storage record, for example, determined by the system or set by the system, a fixed storage record threshold, and/or a set of requirements. For example, the DS client module 34 can detect an imbalance based on the comparison and indicates to migrate the at least some encoded data slices. This method to verify storage utilization is discussed in greater detail with reference to FIG. 10.

In some embodiments, for a file already stored, the DS client module 34 can generate slice names, for example, based on a directory lookup of corresponding source names, for all segments. This can be used to identify the corresponding DST execution units. The DS client module 34 can generate query requests to verify storage and/or to retrieve identifiers of memory devices of the DST execution units utilized to store the slices.

In various embodiments, a processing system of a dispersed storage and task (DST) client module includes at least one processor and a memory that stores operational instructions, that when executed by the at least one processor cause the processing system to obtain a data identifier for slice location identification. A source name corresponding to the data identifier is identified. A plurality of data segments are identified based on the source name. A set of slice names of a plurality of sets of slice names are generated for each of the plurality of data segments. A set of DST execution units are identified based on the plurality of sets of slice names. A set of query requests are generated for each of the plurality of data segments that includes a corresponding set of slice names of the plurality of sets of slice names. The set of query requests are transmitted to the set of DST execution units. A plurality of sets of query responses are received from the set of DST execution units. A storage record is generated that includes the data identifier, the source name, identity of the plurality of data segments, the plurality of sets of slice names, identity of the set of DST execution units, and/or storage location information of the plurality of sets of query responses. Migration of at least some encoded data slices associated with the plurality of sets of slice names is facilitated when the storage record compares unfavorably to a storage record requirement.

In various embodiments, obtaining the data identifier includes receiving the data identifier via a network, initiating a query, extracting the data identifier from an error message, and/or receiving a user request that includes the data identifier. In various embodiments, identifying the source name is based on a directory lookup utilizing the data identifier to extract the source name from a directory. In various embodiments, identifying the plurality of data segments includes extracting identities from a segment allocation table associated with the source name and/or extracting from a first retrieved data segment associated with the source name.

In various embodiments each slice name of each set of slice names of the plurality of sets of slice names includes the source name and a segment number in accordance with the plurality of data segments. In various embodiments, each slice name of each set of slice names of the plurality of sets of slice names includes a pillar index based on a vault affiliated with the plurality of data segments.

In various embodiments, identifying the set of DST execution units includes accessing a table that includes a mapping of slice names to a plurality of physical locations and further includes determining a set of physical locations of the plurality of physical locations for each set of slice names based on the table. The set of DST execution units are identified based on the set of physical locations corresponding to each set of slice names.

In various embodiments, information of the storage record is graphically displayed on a display device associated with the DST client module. In various embodiments, facilitating the migration includes identifying the at least some encoded data slices based on the comparison of the storage record to the storage record requirement. In various embodiments, the at least some encoded data slices are identified when a memory device identifier of the storage location information of the at least some encoded data slices is associated with an unfavorable reliability level.

Figure 10:
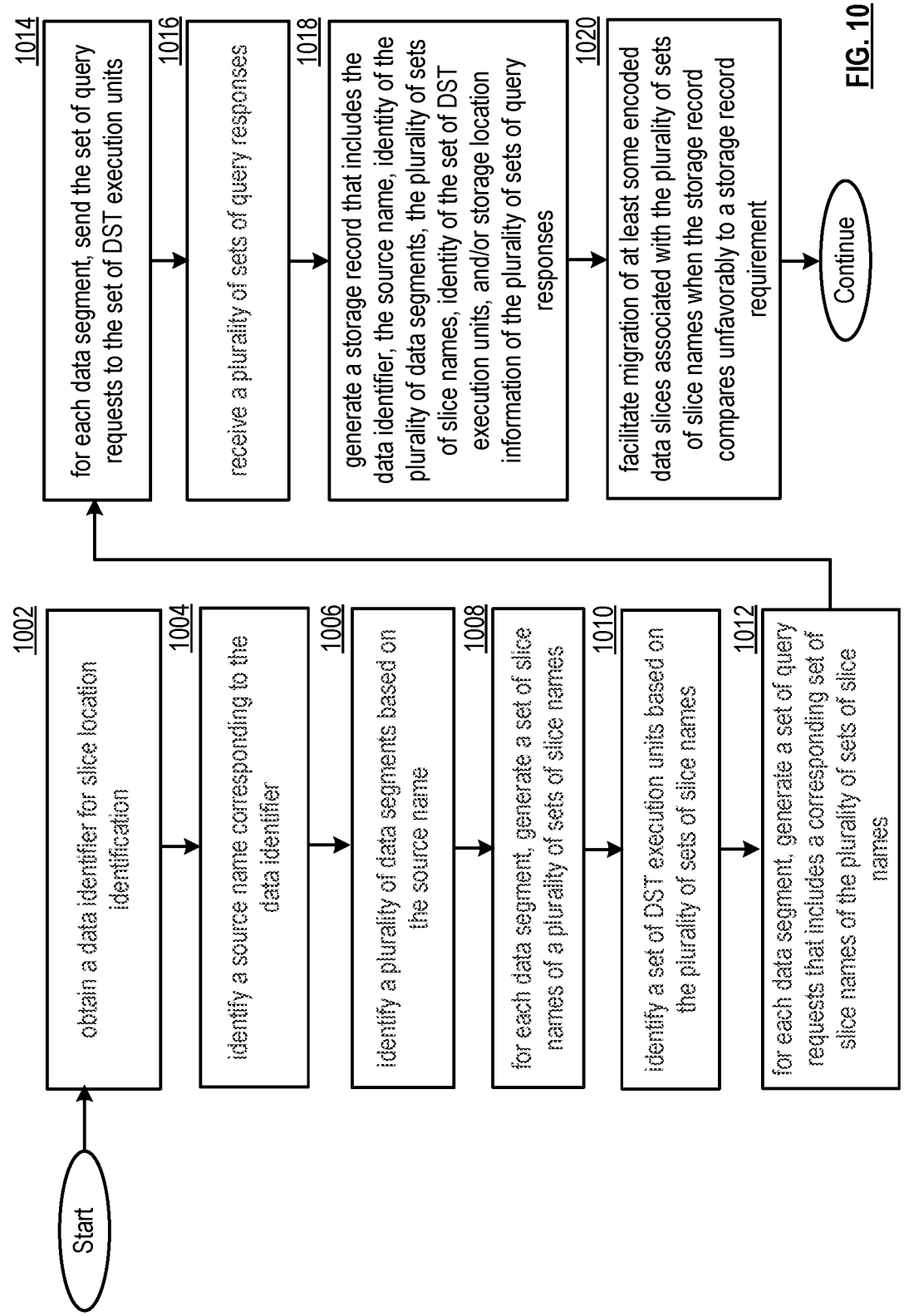
FIG. 10 is a logic diagram of an example of a method of slice location identification in accordance with the present invention.

FIG. 10 is a flowchart illustrating an example of verifying storage utilization. In particular, a method is presented for use in association with one or more functions and features described in conjunction with FIGS. 1-9, for execution by a dispersed storage (DS) client module, for example, being utilized as a DST client module, that includes a processor or via another processing system of a dispersed storage network that includes at least one processor and memory that stores instruction that configure the processor or processors to perform the steps described below.

The method begins with the step 1002 where a processing module (e.g., of a distributed storage (DS) client module) obtains a data identifier (ID) for slice location identification. The obtaining includes at least one of receiving the data identifier, for example, via the network, initiating a query, extracting the data identifier from an error message, and/or receiving a user request, for example, that includes the data identifier. The method continues at step 1004 where the processing module identifies a source name (e.g., a virtual distributed storage and task network (DSTN) address) corresponding to the data ID. The identifying may be based on a directory lookup utilizing the data ID to extract the source name from a directory of the dispersed storage network. The method continues at step 1006 where the processing module identifies a plurality of data segments based on the source name. The identifying includes at least one of extracting identities from a segment allocation table associated with the source name and extracting from a first retrieved data segment associated with the source name.

For each data segment of the plurality of data segments, the method continues at step 1008, where the processing module generates a set of slice names of a plurality of sets of slice names. Each slice name of the set of slice names includes the source name and a segment number in accordance with the plurality of data segments. Each slice name can further include a pillar index based on a vault affiliated with the data. The method continues at step 1010, where the processing module identified as a set of DST execution units based on the plurality of sets of slice names. The identifying includes accessing table mapping slice names to physical locations utilizing the set of slice names to determine the corresponding physical locations.

For each data segment of the plurality of data segments, the method continues at step 1012, where the processing module generates a set of query requests that includes a corresponding set of slice names of the plurality of sets of slice names and/or each request can include a memory identifier indicating where the corresponding slice is stored. For each data segment, the method continues at step 1014, where the processing module sends the set of query requests to the set of DST execution units, for example, via a network. The method continues at step 1016, where the processing module receives a plurality of sets of query requests, for example, via the network. The method continues at step 1018, where the processing module generates a storage record that includes the data identifier, the source name, identity of the plurality of data segments, the plurality of sets of slice names, identity of the set of DST execution units, and/or storage location information of the plurality of sets of query responses. Alternatively, or in addition, the processing module can graphically display information of the storage record.

The method continues at step 1020, where the processing module facilitates migration of at least some encoded data slices associated with the plurality sets of slice names when the storage record compares unfavorably to a storage record requirement, which can include a desired storage record, for example, determined by the system or set by the system, a fixed storage record threshold, and/or a set of requirements. The facilitating includes identifying the at least some encoded data slices based on the comparison. For example, a processing module identifies the at least some encoded data slices to migrate when a memory device identifier of the storage location information is associated with an unfavorable reliability level.

In various embodiments, a non-transitory computer readable storage medium includes at least one memory section that stores operational instructions that, when executed by a processing system of a dispersed storage network (DSN) that includes a processor and a memory, causes the processing system to obtain a data identifier for slice location identification. A source name corresponding to the data identifier is identified. A plurality of data segments are identified based on the source name. A set of slice names of a plurality of sets of slice names are generated for each of the plurality of data segments. A set of DST execution units are identified based on the plurality of sets of slice names. A set of query requests are generated for each of the plurality of data segments that includes a corresponding set of slice names of the plurality of sets of slice names. The set of query requests are transmitted to the set of DST execution units. A plurality of sets of query responses are received from the set of DST execution units. A storage record is generated that includes the data identifier, the source name, identity of the plurality of data segments, the plurality of sets of slice names, identity of the set of DST execution units, and/or storage location information of the plurality of sets of query responses. Migration of at least some encoded data slices associated with the plurality of sets of slice names is facilitated when the storage record compares unfavorably to a storage record requirement.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) client module that includes a processor, the method comprises:

generating a set of query requests for each of a plurality of data segments that includes a corresponding set of slice names of a plurality of sets of slice names, wherein each slice name of each set of slice names of the plurality of sets of slice names includes a pillar index based on a vault affiliated with the plurality of data segments;

transmitting the set of query requests to a set of DST execution units;

receiving a plurality of sets of query responses from the set of DST execution units;

obtaining an data identifier for slice location identification, wherein obtaining the data identifier includes at least one of: receiving the data identifier via a network, initiating a query, extracting the data identifier from an error message, or receiving a user request that includes the data identifier, and wherein the error message results in rebuilding bad and/or missing slices using other sets of retrieved encoded data slices that are deemed to be good slices;

generating a storage record that includes the data identifier and an identity of the set of DST execution units, wherein the set of DST execution units are identified based on accessing a table that includes a mapping of slice names to a plurality of physical locations, determining a set of physical locations of the plurality of physical locations for each set of slice names based on the table, further based on the set of physical locations corresponding to each set of slice names; and facilitating migration of at least some encoded data slices associated with the plurality of sets of slice names when the storage record compares unfavorably to a storage record requirement, wherein facilitating the migration includes identifying the at least some encoded data slices based on the comparison of the storage record to the storage record requirement; and wherein the at least some encoded data slices are identified when a memory device identifier of storage location information of the at least some encoded data slices is associated with an unfavorable reliability level.

2. The method of claim 1, further comprising:
identifying a source name corresponding to the data identifier; and
identifying the plurality of data segments based on the source name.

3. The method of claim 1, wherein a source name is identified based on a directory lookup utilizing the data identifier to extract the source name from a directory.

4. The method of claim 2, wherein identifying the plurality of data segments includes at least one of: extracting identities from a segment allocation table associated with the source name or extracting from a first retrieved data segment associated with the source name.

5. The method of claim 2, wherein each slice name of each set of slice names of the plurality of sets of slice names includes the source name and a segment number in accordance with the plurality of data segments.

6. The method of claim 1, further comprising:
generating the set of slice names of the plurality of sets of slice names for each of the plurality of data segments; and
identifying the set of DST execution units based on the plurality of sets of slice names.

7. The method of claim 1, wherein information of the storage record is graphically displayed on a display device associated with the DST client module.

8. A processing system of a dispersed storage and task (DST) client module comprises:
at least one processor;
a memory that stores operational instructions, that when executed by the at least one processor cause the processing system to perform operations including:
generating a set of query requests for each of a plurality of data segments that includes a corresponding set of slice names of a plurality of sets of slice names, wherein each slice name of each set of slice names of the plurality of sets of slice names includes a pillar index based on a vault affiliated with the plurality of data segments;
transmitting the set of query requests to a set of DST execution units;
receiving a plurality of sets of query responses from the set of DST execution units;
obtaining an data identifier for slice location identification, wherein obtaining the data identifier includes at least one of: receiving the data identifier via a network, initiating a query, extracting the data identifier from an error message, or receiving a user request that includes the data identifier, and wherein the error message results in rebuilding bad and/or missing slices using other sets of retrieved encoded data slices that are deemed to be good slices;
generating a storage record that includes the data identifier and an identity of the set of DST execution units, wherein the set of DST execution units are identified based on accessing a table that includes a mapping of slice names to a plurality of physical locations, determining a set of physical locations of the plurality of physical locations for each set of slice names based on the table, further based on the set of physical locations corresponding to each set of slice names; and facilitating migration of at least some encoded data slices associated with the plurality of sets of slice names when the storage record compares unfavorably to a storage record requirement, wherein facilitating the migration includes identifying the at least some encoded data slices based on the comparison of the storage record to the storage record requirement; and wherein the at least some encoded data slices are identified when a memory device identifier of storage location information of the at least some encoded data slices is associated with an unfavorable reliability level.

9. The processing system of claim 8, wherein the operations further include:
identifying a source name corresponding to the data identifier; and
identifying the plurality of data segments based on the source name.

10. The processing system of claim 9, wherein a source name is identified based on a directory lookup utilizing the data identifier to extract the source name from a directory.

11. The processing system of claim 9, wherein identifying the plurality of data segments includes at least one of: extracting identities from a segment allocation table associated with the source name or extracting from a first retrieved data segment associated with the source name.

12. The processing system of claim 9, wherein each slice name of each set of slice names of the plurality of sets of slice names includes the source name and a segment number in accordance with the plurality of data segments.

13. The processing system of claim 8, wherein the operations further include:
generating the set of slice names of the plurality of sets of slice names for each of the plurality of data segments; and
identifying the set of DST execution units based on the plurality of sets of slice names.

14. A non-transitory computer readable storage medium comprises:
at least one memory section that stores operational instructions that, when executed by a processing system of a dispersed storage network (DSN) that includes a processor and a memory, causes the processing system to perform operations including:
generating a set of query requests for each of a plurality of data segments that includes a corresponding set of slice names of a plurality of sets of slice names, wherein each slice name of each set of slice names of the plurality of sets of slice names includes a pillar index based on a vault affiliated with the plurality of data segments;

transmitting the set of query requests to a set of DST execution units;
receiving a plurality of sets of query responses from the set of DST execution units;
obtaining an data identifier for slice location identification, wherein obtaining the data identifier includes at least one of: receiving the data identifier via a network, initiating a query, extracting the data identifier from an error message, or receiving a user request that includes the data identifier, and wherein the error message results in rebuilding bad and/or missing slices using other sets of retrieved encoded data slices that are deemed to be good slices;
generating a storage record that includes the data identifier and an identity of the set of DST execution units, wherein the set of DST execution units are identified based on accessing a table that includes a mapping of slice names to a plurality of physical locations, determining a set of physical locations of the plurality of physical locations for each set of slice names based on the table, further based on the set of physical locations corresponding to each set of slice names; and
facilitating migration of at least some encoded data slices associated with the plurality of sets of slice names when the storage record compares unfavorably to a storage record requirement, wherein facilitating the migration includes identifying the at least some encoded data slices based on the comparison of the storage record to the storage record requirement; and wherein the at least some encoded data slices are identified when a memory device identifier of storage location information of the at least some encoded data slices is associated with an unfavorable reliability level.

* * * * *